United States Patent
Umehara et al.

(10) Patent No.: US 10,686,397 B2
(45) Date of Patent: Jun. 16, 2020

(54) MOTOR SYSTEM, MOTOR DRIVE DEVICE, REFRIGERATION CYCLE DEVICE, AND AIR CONDITIONER

(71) Applicant: Mitsubishi Electric Corporation, Tokyo (JP)

(72) Inventors: Shigeo Umehara, Tokyo (JP); Koichi Arisawa, Tokyo (JP); Yosuke Shinomoto, Tokyo (JP); Takashi Yamakawa, Tokyo (JP); Shinya Toyodome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/097,298

(22) PCT Filed: Jun. 17, 2016

(86) PCT No.: PCT/JP2016/068112
§ 371 (c)(1),
(2) Date: Oct. 29, 2018

(87) PCT Pub. No.: WO2017/216959
PCT Pub. Date: Dec. 21, 2017

(65) Prior Publication Data
US 2019/0140575 A1    May 9, 2019

(51) Int. Cl.
*H02P 21/00* (2016.01)
*H02P 27/12* (2006.01)
(Continued)

(52) U.S. Cl.
CPC .............. *H02P 27/12* (2013.01); *F25B 31/02* (2013.01); *H02M 3/155* (2013.01); *H02M 7/53871* (2013.01); *H02P 21/05* (2013.01); *H02P 21/18* (2016.02); *H02P 21/22* (2016.02); *H02P 21/24* (2016.02); *H02P 25/22* (2013.01); *H02P 27/06* (2013.01); *H02M 2001/007* (2013.01)

(58) Field of Classification Search
CPC ................................. H02P 27/12; H02P 21/18
USPC ..................................................... 318/400.02
See application file for complete search history.

(56) References Cited

U.S. PATENT DOCUMENTS 8,405,341 B2    3/2013 Tagome
8,497,648 B2 *  7/2013 Tagome ................. B60L 50/51
                                                   318/400.41
(Continued)

FOREIGN PATENT DOCUMENTS

JP    2008-043046 A    2/2008
JP    2011-024377 A    2/2011
(Continued)

OTHER PUBLICATIONS

International Search Report of the International Searching Authority dated Sep. 6, 2016 for the corresponding international application No. PCT/JP2016/068112 (and English translation).

*Primary Examiner* — Erick D Glass
(74) *Attorney, Agent, or Firm* — Posz Law Group, PLC

(57) ABSTRACT

A motor system according to the present invention includes: a motor including a first winding portion and a second winding portion, the second winding portion having a larger number of turns than the first winding portion; a first inverter connected to the first winding portion; and a second inverter connected to the second winding portion.

14 Claims, 11 Drawing Sheets

(51) Int. Cl.
*H02P 25/22* (2006.01)
*H02P 27/06* (2006.01)
*H02P 21/24* (2016.01)
*H02M 3/155* (2006.01)
*H02P 21/18* (2016.01)
*H02P 21/22* (2016.01)
*F25B 31/02* (2006.01)
*H02M 7/5387* (2007.01)
*H02P 21/05* (2006.01)
*H02M 1/00* (2006.01)

(56) References Cited

U.S. PATENT DOCUMENTS

| | | | |
|---|---|---|---|
| 2011/0057591 A1* | 3/2011 | Tagome | B60L 50/51 318/400.23 |
| 2013/0079993 A1 | 3/2013 | Sugiyama | |
| 2013/0264987 A1 | 10/2013 | Uchida et al. | |
| 2015/0097505 A1 | 4/2015 | Kume et al. | |
| 2016/0204727 A1* | 7/2016 | Fujii | H02P 21/22 318/400.02 |
| 2016/0241073 A1* | 8/2016 | Hatakeyama | H02M 1/12 |

FOREIGN PATENT DOCUMENTS

| | | |
|---|---|---|
| JP | 2012-131004 A | 7/2012 |
| JP | 2013-071550 A | 4/2013 |
| JP | 2015-077003 A | 4/2015 |
| JP | 2015-231286 A | 12/2015 |
| WO | 2010/119662 A1 | 10/2010 |

\* cited by examiner

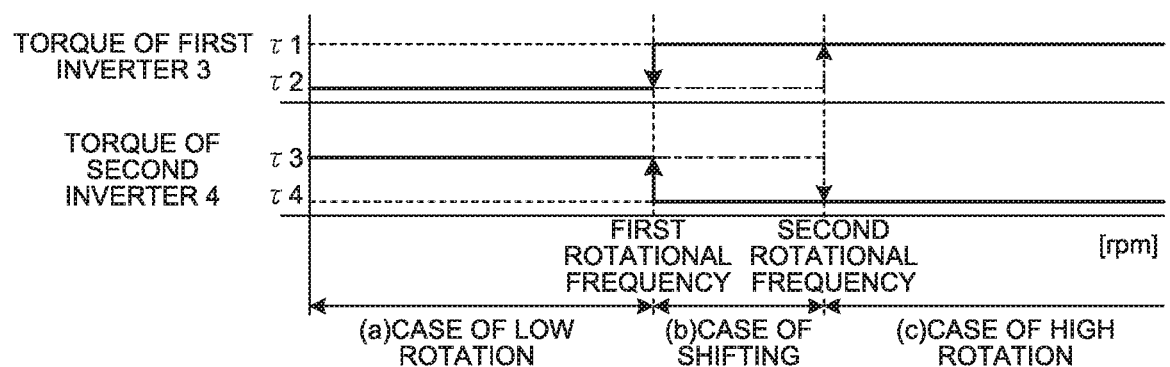
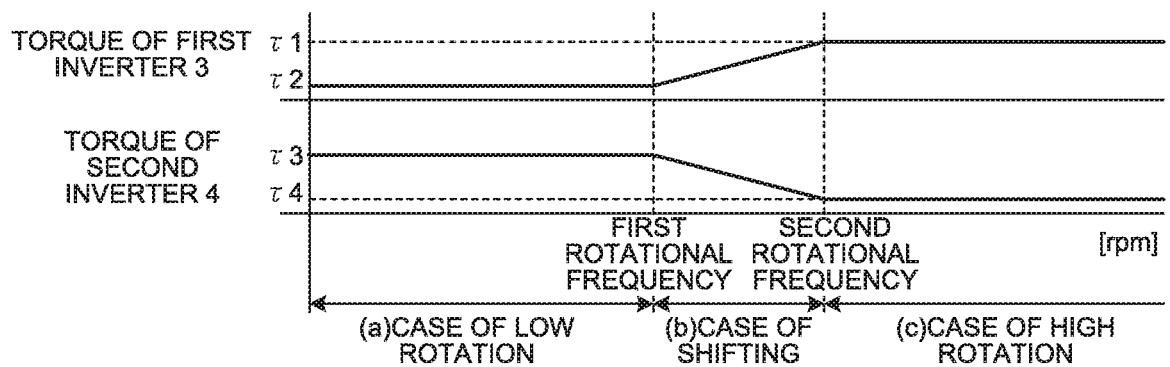

MOTOR SYSTEM, MOTOR DRIVE DEVICE, REFRIGERATION CYCLE DEVICE, AND AIR CONDITIONER

CROSS REFERENCE TO RELATED APPLICATION

This application is a U.S. national stage application of International Patent Application No. PCT/JP2016/068112 filed on Jun. 17, 2016, the disclosure of which is incorporated herein by reference.

TECHNICAL FIELD

The present invention relates to a motor system including a motor having a plurality of three-phase windings, a motor drive device that drives the motor, a refrigeration cycle device, and an air conditioner.

BACKGROUND

There is a motor system including a motor having a plurality of three-phase windings, the three-phase windings including three-phase inverters for controlling the three-phase windings. Patent Document 1 below discloses a synchronous electric motor driving system capable of suppressing current ripple while reducing switching loss. Specifically, the synchronous electric motor driving system has a plurality of three-phase windings, and includes three-phase inverters for the three-phase windings. The three-phase inverters generate three-phase AC power using different switching frequencies, and supply AC power to the corresponding three-phase winding portions to achieve the above effects.

PATENT LITERATURE

Patent Literature 1: PCT Patent Application Laid-open No. 2010/119662

However, in the technique described in Patent Document 1, the switching frequency of at least one of the plurality of three-phase inverters is set low so that the ripples of the motor currents output from the plurality of three-phase inverters interfere with each other, whereby the ripple of the motor current output from the three-phase inverter operating at a low switching frequency is suppressed. Therefore, the technique described in Patent Document 1 can only suppress the ripple of the motor current and reduce switching loss for the three-phase inverter operating at a low switching frequency. This causes a problem in that the effect of suppressing the ripple of the motor current is limited in the entire motor system, and the loss reduction is also limited.

SUMMARY

The present invention has been made in order to solve the above problem, and an object thereof is to obtain a motor drive device capable of reducing the loss of the entire motor system.

A motor system according to an aspect of the present invention includes: a first inverter; a second inverter; and a motor including a first winding portion connected to the first inverter and a second winding portion connected to the second inverter. The first winding portion has a first number of turns, the second winding portion has a second number of turns, and the second number is larger than the first number.

The motor drive device according to the present invention can achieve the effect of reducing the loss of the entire motor system.

BRIEF DESCRIPTION OF DRAWINGS

FIG. 3 is a diagram illustrating an example of rotational frequency-torque characteristics according to the first embodiment.

FIG. 4 is a diagram illustrating an example of rotational frequency-torque characteristics according to the first embodiment.

DETAILED DESCRIPTION

Hereinafter, a motor system, a motor drive device, a refrigeration cycle device, and an air conditioner according to embodiments of the present invention will be described in detail based on the drawings. The present invention is not limited to the embodiments.

First Embodiment

Figure 1:
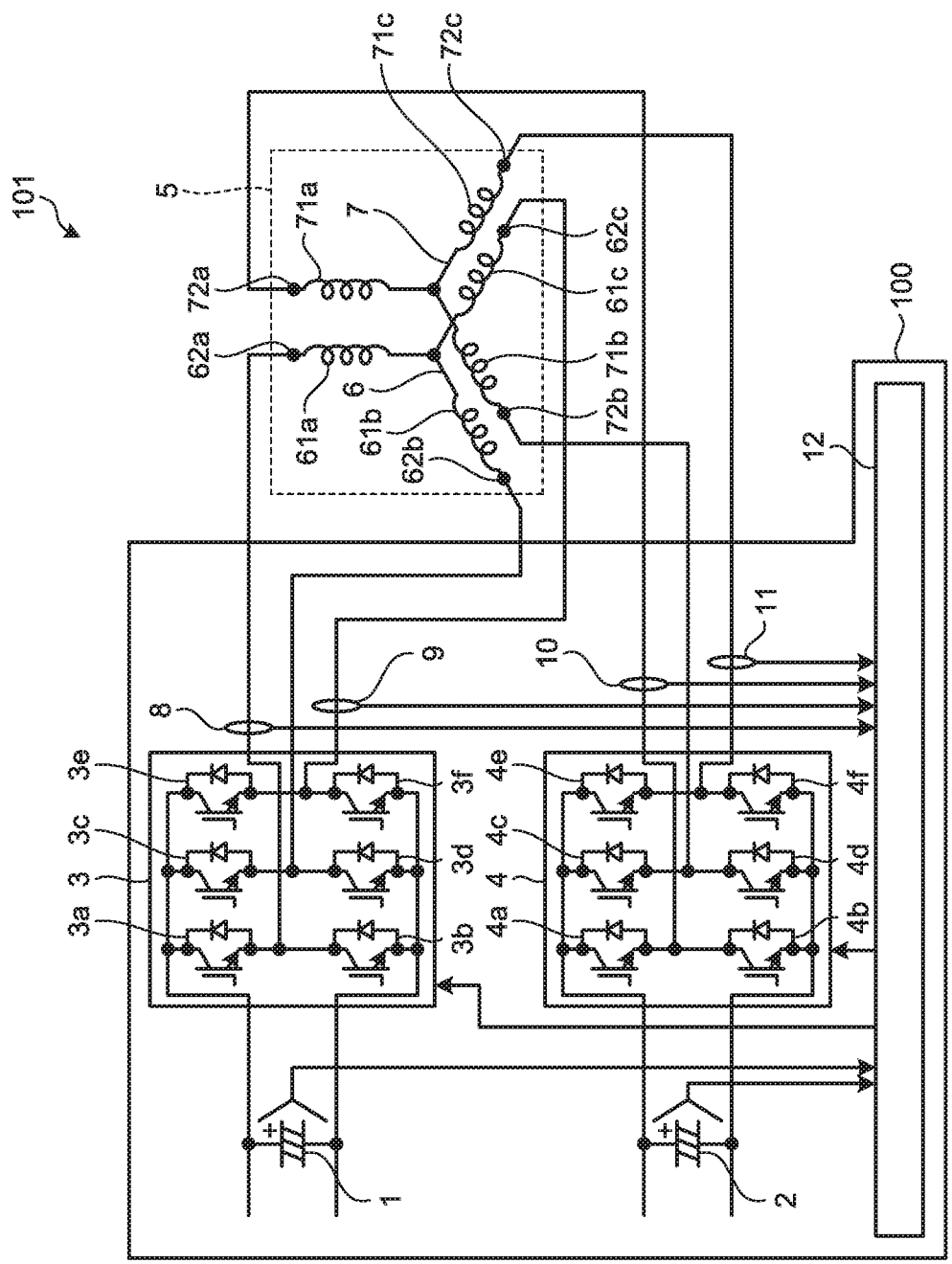
FIG. 1 is a diagram illustrating an exemplary configuration of a motor system according to a first embodiment.

FIG. 1 is a diagram illustrating an exemplary configuration of a motor system 101 according to the first embodiment of the present invention. As illustrated in FIG. 1, the motor system 101 according to the first embodiment includes a motor 5 and a motor drive device 100 that drives the motor 5.

The motor 5 includes a first winding portion 6 and a second winding portion 7. The number of windings, that is, the number of turns, of the second winding portion 7 is larger than the number of turns of the first winding portion 6, and the insulation classification of the second winding portion 7 is higher than the insulation classification of the first winding portion 6. That is, the first winding portion 6 has a first number of turns, the second winding portion 7 has a second number of turns, and the second number is larger than the first number. The withstanding voltage of the second winding portion 7 is higher than the withstanding voltage of the first winding portion 6. The first winding portion 6 includes a U-phase winding portion 61a, a V-phase winding portion 61b, and a W-phase winding portion 61c. The U-phase winding portion 61a is connected to a terminal 62a, the V-phase winding portion 61b is connected to a terminal 62b, and the W-phase winding portion 61c is connected to a terminal 62c. The second winding portion 7 includes a U-phase winding portion 71a, a V-phase winding portion 71b, and a W-phase winding portion 71c. The U-phase winding portion 71a is connected to a terminal 72a, the V-phase winding portion 71b is connected to a terminal 72b, and the W-phase winding portion 71c is connected to a terminal 72c.

The motor drive device 100 includes a first smoothing unit 1, a second smoothing unit 2, a first inverter 3, and a second inverter 4. The first smoothing unit 1 smoothes input DC power to supply DC power to the first inverter 3. The second smoothing unit 2 has a higher withstanding voltage than the first smoothing unit 1, and smoothes input DC power to supply DC power to the second inverter 4. The first inverter 3 is connected in parallel to the first smoothing unit 1 and connected to the first winding portion 6. The second inverter 4 is connected in parallel to the second smoothing unit 2 and connected to the second winding portion 7. Further, the motor drive device 100 includes a control unit 12, a current detection unit 8, a current detection unit 9, a current detection unit 10, and a current detection unit 11. The control unit 12 controls the first inverter 3 and the second inverter 4. The current detection unit 8 detects the U-phase current of the first winding portion 6 of the motor 5. The current detection unit 9 detects the W-phase current of the first winding portion 6 of the motor 5. The current detection unit 10 detects the U-phase current of the second winding portion 7 of the motor 5. The current detection unit 11 detects the W-phase current of the second winding portion 7 of the motor 5.

The first inverter 3 includes switching elements 3a and 3b which are a pair of series-connected switching elements, switching elements 3c and 3d which are a pair of series-connected switching elements, and switching elements 3e and 3f which are a pair of series-connected switching elements. Each pair of switching elements 3a and 3b, 3c and 3d, and 3e and 3f is referred to as an arm. The middle point of each arm of the first inverter 3 is connected to the winding portion of the corresponding phase of the first winding portion 6.

Specifically, the arm including the switching element 3a and the switching element 3b is connected to the terminal 62a, the arm including the switching element 3c and the switching element 3d is connected to the terminal 62b, and the arm including the switching element 3e and the switching element 3f is connected to the terminal 62c. The switching element of each arm connected to the positive side, i.e. the positive electrode, of the two ends of the first smoothing unit 1 is also referred to as an upper switching element, and the switching element of each arm connected to the negative side, i.e. the negative electrode, of the two ends of the first smoothing unit 1 is also referred to as a lower switching element.

The second inverter 4 includes switching elements 4a and 4b which are a pair of series-connected switching elements, switching elements 4c and 4d which are a pair of series-connected switching elements, and switching elements 4e and 4f which are a pair of series-connected switching elements. Each pair of switching elements 4a and 4b, 4c and 4d, and 4e and 4f is referred to as an arm. The middle point of each arm of the second inverter 4 is connected to the winding portion of the corresponding phase of the second winding portion 7.

Specifically, the arm including the switching element 4a and the switching element 4b is connected to the terminal 72a, the arm including the switching element 4c and the switching element 4d is connected to the terminal 72b, and the arm including the switching element 4e and the switching element 4f is connected to the terminal 72c. The switching element of each arm connected to the positive side of the two ends of the second smoothing unit 2 is also referred to as an upper switching element, and the switching element of each arm connected to the negative side is also referred to as a lower switching element.

Each switching element of the first inverter 3 is made of, for example, a silicon (Si) semiconductor, and a switching element of the second inverter 4 is made of, for example, a wide bandgap semiconductor such as a SiC semiconductor. Therefore, the second inverter 4 has a higher withstanding voltage than the first inverter 3. A wide bandgap semiconductor can be a wide bandgap semiconductor including gallium nitride (GaN), silicon carbide (SiC), diamond, or the like. The use of wide bandgap semiconductors raises the withstanding voltage property and allowable current density, whereby the module can be reduced in size. A heat dissipation fin of a heat dissipation unit can also be reduced in size because a wide bandgap semiconductor has a high heat resistance property. In addition, the second inverter 4 has a smaller current capacity than the first inverter 3. This is because the second winding portion 7 can generate a desired torque with a smaller current than the first winding portion 6. By reducing the current capacity of the second inverter 4, cost can be reduced.

Figure 2:
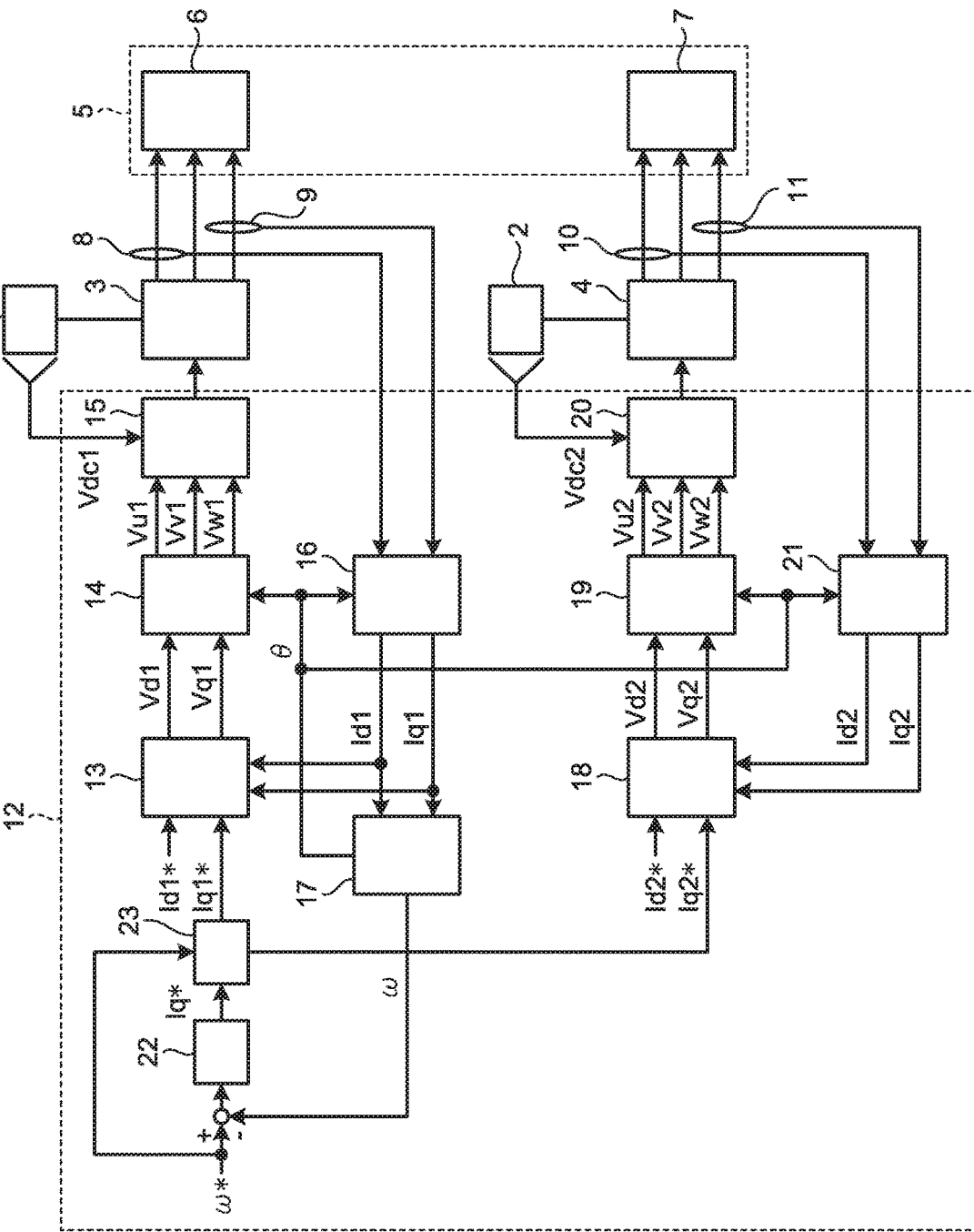
FIG. 2 is a diagram illustrating an exemplary configuration of a control unit according to the first embodiment.

FIG. 2 is a diagram illustrating an exemplary configuration of the control unit 12 according to the first embodiment. As illustrated in FIG. 2, the control unit 12 includes a first current control unit 13, a first voltage command generation unit 14, a first PWM generation unit 15, a first three-phase/two-phase conversion unit 16, a speed estimation unit 17, a second current control unit 18, a second voltage command generation unit 19, a second PWM generation unit 20, a second three-phase/two-phase conversion unit 21, a torque current command generation unit 22, and a torque current command distribution unit 23.

The torque current command generation unit 22 generates a torque current command Iq* based on the difference between a speed command ω* and a speed estimated value ω that is the rotational speed of the motor 5 estimated by the speed estimation unit 17. The speed command ω* is input from the outside, determined in advance, or calculated by internal operation. The torque current command generation unit 22 can use any calculation method such as proportional control and integral control to calculate the torque current command based on the difference between the speed command ω* and the speed estimated value ω that is the rotational speed of the motor 5 estimated by the speed estimation unit 17. At this time, the torque current command distribution unit 23 divides the q-axis torque current command Iq* into a q-axis torque current command Iq1* for the first inverter 3 and a q-axis current command Iq2* for the second inverter 4. The method of assigning a torque current command according to the present embodiment will be described later. The speed command ω* and a d-axis torque current command Id* that is to be described later are input from the outside, determined in advance, or calculated by internal operation.

The first three-phase/two-phase conversion unit 16 calculates a d-axis current Id1 and a q-axis current Iq1 corresponding to the first inverter 3 based on current information indicating the U-phase current of the first winding portion 6 detected by the current detection unit 8, current information indicating the W-phase current of the first winding portion 6 detected by the current detection unit 9, and the phase of the motor 5 estimated by the speed estimation unit 17. The speed estimation unit 17 estimates the rotational speed and phase of the motor 5 based on the d-axis current Id1 and the q-axis current Iq1, and outputs the speed estimated value ω and a phase estimated value θ.

The first current control unit 13 generates and outputs output voltages Vd1 and Vq1 corresponding to the d-axis and the q-axis of the first inverter 3 based on the torque current command Iq1* assigned by the torque current command distribution unit 23, a d-axis current command Id1*, the d-axis current Id1, and the q-axis current Iq1. The first voltage command generation unit 14 generates output voltages Vu1, Vv1, and Vw1 of the first inverter 3 corresponding to the U-phase, the V-phase, and the W-phase, respectively, based on Vd1, Vq1, and θ. The first PWM generation unit 15 generates a PWM signal for controlling each switching element of the first inverter 3 based on the voltage between the two ends of the first smoothing unit 1, that is, a bus voltage Vdc1 of the first inverter, and on the output voltages Vu1, Vv1, and Vw1, and outputs the PWM signal to the first inverter 3. A PWM signal is a pulse-like signal indicating that each switching element is turned on or off. Any method may be used as a specific method of generating a PWM signal, and a method of generating a PWM signal in general motor control can be used.

The second three-phase/two-phase conversion unit 21 calculates a d-axis current Id2 and a q-axis current Iq2 corresponding to the second inverter 4 based on current information indicating the U-phase current of the second winding portion 7 detected by the current detection unit 10, current information indicating the W-phase current of the second winding portion 7 detected by the current detection unit 11, and the phase of the motor 5 estimated by the speed estimation unit 17.

The second current control unit 18 generates and outputs output voltages Vd2 and Vq2 corresponding to the d-axis and the q-axis of the second inverter 4 based on the torque current command Iq2* assigned by the torque current command distribution unit 23, a d-axis torque current command Id2*, the d-axis current Id2, and the q-axis current Iq2. The second voltage command generation unit 19 generates output voltages Vu2, Vv2, and Vw2 of the second inverter 4 corresponding to the U-phase, the V-phase, and the W-phase, based on Vd2, Vq2, and θ. The second PWM generation unit 20 generates a PWM signal for controlling each switching element of the second inverter 4 based on the voltage between the two ends of the second smoothing unit 2, that is, a bus voltage Vdc2 of the second inverter 4, and on the output voltages Vu2, Vv2, and Vw2, and outputs the PWM signal to the second inverter 4.

Next, operation of the present embodiment will be described. Each of FIGS. 3 and 4 is a diagram illustrating an example of rotational frequency-torque characteristics according to the first embodiment. In FIGS. 3 and 4, the horizontal axis represents rotational frequency, that is, rotational speed, and the vertical axis represents torque. In FIGS. 3 and 4, the torque of the first inverter 3 is illustrated on the upper side, and the torque of the second inverter 4 is illustrated on the lower side.

In the present embodiment, as illustrated in section (a) of FIG. 3, in a case where the rotational frequency of the motor 5, i.e., the rotational frequency corresponding to the speed command ω*, is equal to or lower than a first rotational frequency set in advance, that is, in the case of low rotation, the torque current command distribution unit 23 assigns toque τ2 and toque τ3 to the first inverter 3 and the second inverter 4, respectively. In FIG. 3, section (a) is described as (a) case of low rotation. Assuming that the torque corresponding to the torque current command Iq* is represented by τ, τ2 and τ3 satisfy τ=τ2+τ3 and τ3>τ2. The reason why the torque of the second inverter 4 is made larger than the torque of the first inverter 3 when the rotational frequency of the motor 5 is equal to or lower than the first rotational frequency is that because the second winding portion 7 has a larger number of turns of windings than the first winding portion 6, the second winding portion 7 can generate the same torque as the first winding portion 6 with a smaller current than the first winding portion 6, which can reduce motor loss and inverter loss if it is assumed that the same torque is generated in the first winding portion 6 and the second winding portion 7.

As illustrated in section (c) of FIG. 3, in a case where the rotational frequency corresponding to the speed command ω* is equal to or higher than a second rotational frequency determined in advance, the torque current command distribution unit 23 assigns torque τ1 and torque τ4 to the first inverter 3 and the second inverter 4, respectively. In FIG. 3, section (c) is described as (c) case of high rotation. Note that the second rotational frequency is equal to or higher than the first rotational frequency, and τ1 and τ4 satisfy τ=τ1+τ4 and τ1>τ4. The reason why the torque of the second inverter 4 is made smaller than the torque of the first inverter 3 is that because the second winding portion 7 has a larger number of turns of windings than the first winding portion 6, the induced voltage generated in the second winding portion 7 is larger than the induced voltage in the first winding portion 6, and it is necessary to cause a field weakening current to flow in the high-speed rotation range, which increases motor loss and inverter loss. However, even in the high-speed rotation range, if the motor loss in the second winding portion 7 is not different from the motor loss in the first winding portion 6, τ1=τ2=τ3=τ4 may be satisfied so that the torque of the first inverter 3 and the torque of the second inverter 4 may be equal to each other.

Further, as illustrated in section (b) of FIG. 3, in a case where the rotational frequency corresponding to the speed command ω* is higher than the first rotational frequency and equal to or lower than the second rotational frequency, hysteresis may be provided between the first rotational frequency and the second rotational frequency so that stepwise changes are performed between the first rotational frequency and the second rotational frequency. That is, in a case where the rotational speed increases, the assignment in section (b) of FIG. 3 is the same as the assignment in section (a) of FIG. 3, and in a case where the rotational speed decreases, the assignment in section (b) of FIG. 3 is the same as the assignment in section (c) of FIG. 3. In FIG. 3, section (b) is described as (b) case of shifting.

Alternatively, between the first rotational frequency and the second rotational frequency, the torque of the first inverter 3 and the torque of the second inverter 4 may be gradually changed as illustrated in FIG. 4. In FIG. 4, between the first rotational frequency and the second rotational frequency, the torque assigned to each inverter is linearly complemented by a straight line. The torque fluctuation is smaller in the switching illustrated in FIG. 4 than in the stepwise changes illustrated in the example of FIG. 3, so that vibration and sound of the motor can be reduced.

The torque current command distribution unit 23 divides the q-axis torque current command Iq* into the q-axis torque current command Iq1* for the first inverter 3 and the q-axis torque current command Iq2* for the second inverter 4 in accordance with the result of torque assignment described above. In the above description, the torque current command is first converted into toque and reconverted into torque current commands after distribution. Alternatively, Iq* may be directly divided into Iq1* and Iq2* at the above torque ratio.

As described above, if the rotational frequency of the motor 5 is lower than the first rotational frequency determined in advance, the control unit 12 generates torque current commands corresponding to the first inverter 3 and the second inverter 4 such that the torque corresponding to the second inverter 4 is larger than the torque corresponding to the first inverter 3. Further, if the rotational frequency of the motor 5 is equal to or higher than the second rotational frequency, which is equal to or higher than the first rotational frequency, the control unit 12 generates torque current commands corresponding to the first inverter 3 and the second inverter 4 such that the torque corresponding to the first inverter 3 is larger than the torque corresponding to the second inverter 4.

Next, the first current control unit 13 obtains the d-axis voltage Vd1 and the q-axis voltage Vq1 corresponding to the first inverter 3 based on the computed d-axis current Id1 and q-axis current Iq1 of the first inverter 3, the torque current command Iq1* for the first inverter 3, and the d-axis current command Id1*. The first voltage command generation unit 14 calculates an output voltage corresponding to each phase of the first inverter 3 from the d-axis voltage Vd1 and q-axis voltage Vq1 output from the first current control unit 13 and the phase calculated by the speed estimation unit 17. The first PWM generation unit 15 controls the first inverter 3 by generating and outputting a PWM signal to be output to each switching element of the first inverter 3 based on the output voltage calculated by the first voltage command generation unit 14 and Vdc1.

Similarly, the second current control unit 18 obtains the d-axis voltage Vd2 and the q-axis voltage Vq2 corresponding to the second inverter 4 based on the computed d-axis current Id2 and q-axis current Iq2 of the second inverter 4, the torque current command Iq2* for the second inverter 4, and the d-axis current command Id2*. The second voltage command generation unit 19 calculates an output voltage corresponding to each phase of the second inverter 4 from the d-axis voltage Vd2 and q-axis voltage Vq2 output from the second current control unit 18 and the phase calculated by the speed estimation unit 17. The second PWM generation unit 20 controls the second inverter 4 by generating and outputting PWM signals to be output to each switching element of the second inverter 4 based on the voltage calculated by the second voltage command generation unit 19 and Vdc2.

Here, the carrier frequencies of the first PWM generation unit 15 and the second PWM generation unit 20 are set such that the second PWM generation unit 20 has a higher carrier frequency than the first PWM generation unit 15. This is because the switching loss of the second inverter 4 is smaller than the switching loss of the first inverter 3 because the second inverter 4 includes a SiC semiconductor. However, the carrier frequencies are not limited to this example, and only need to be set in consideration of the switching loss of the first inverter 3 and the second inverter 4 and noise caused by the carrier frequencies. By setting the carrier frequency of the second PWM generation unit 20 higher than the carrier frequency of the first PWM generation unit 15, the switching frequency of the second inverter 4 becomes higher than the switching frequency of the first inverter 3.

Further, the carriers of the first PWM generation unit 15 and the second PWM generation unit 20 may be synchronized, or may be shifted by half a carrier frequency or by one third of a carrier frequency. That is, the carrier used for generating signals for driving the first inverter 3 and the carrier used for generating signals for driving the second inverter 4 may be synchronized, or may be shifted by half a carrier period or by one third of a carrier frequency. For example, when the carriers of the first PWM generation unit 15 and the second PWM generation unit 20 are shifted by half a carrier frequency, the current ripple components of the carrier frequency components of the first inverter 3 and the second inverter 4 cancel each other out, and harmonic iron loss generated in the motor is reduced.

In the above example, the insulation classification of the second winding portion 7 is higher than the insulation classification of the first winding portion 6, but depending on the number of turns of windings of the second winding portion 7, the insulation classification of the second winding portion 7 may be the same as the insulation classification of the first winding portion 6. In the above example, the withstanding voltage of the second smoothing unit 2 is set higher than the withstanding voltage of the first smoothing unit 1, but if there is no difference in voltage in consideration of the regenerative voltage from the motor 5 or the like, the withstanding voltage of the first smoothing unit 1 may be the same as the withstanding voltage of the second smoothing unit 2.

In the above example, the second inverter 4 has a higher withstanding voltage and a smaller current capacity than the first inverter 3. However, in a case where the loss in the second inverter 4 needs to be further reduced, the second inverter 4 may have the same current capacity as the first inverter 3, or the second inverter 4 may have a larger current capacity than the first inverter 3.

In the above example, the first inverter 3 includes a Si semiconductor, and the second inverter 4 includes a wide bandgap semiconductor. To the contrary, it is possible that the first inverter 3 includes a wide bandgap semiconductor, and the second inverter 4 includes a Si semiconductor, or the first inverter 3 and the second inverter 4 both include wide bandgap semiconductors. Each switching element only needs to be selected in consideration of the balance between the number of turns of windings of the first winding portion 6 and the second winding portion 7 and the loss and cost of the entire motor drive device.

Figure 5:
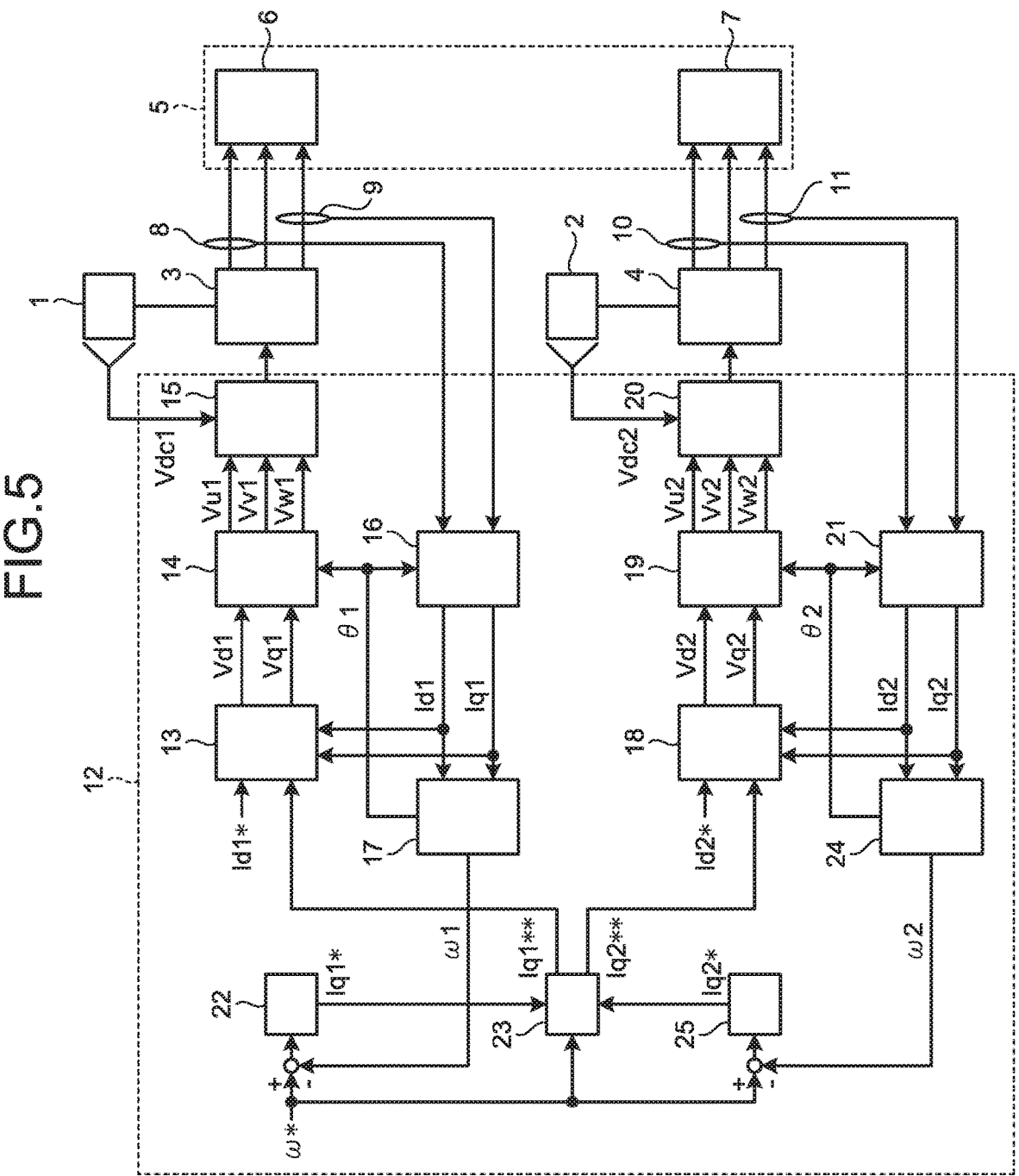
FIG. 5 is a diagram illustrating an exemplary configuration of the control unit according to the first embodiment for performing speed estimation based on the motor current of a second winding portion.

In the example illustrated in FIG. 2, the speed of the motor 5 is estimated on the basis of the motor current of the first winding portion 6, but speed estimation based on the motor current of the second winding portion 7 may further be performed. FIG. 5 is a diagram illustrating an exemplary configuration of the control unit 12 according to the first embodiment for performing speed estimation based on the motor current of the second winding portion 7. In the exemplary configuration illustrated in FIG. 5, a second speed estimation unit 24 and a second torque current command generation unit 25 are added to the exemplary configuration illustrated in FIG. 2. In FIG. 5, components having the same functions as the functions of the exemplary configuration illustrated in FIG. 2 are denoted by the same reference signs as the reference signs in FIG. 2. Hereinafter, differences between the exemplary configuration of FIG. 5 and the exemplary configuration of FIG. 2 will be described, while explanations of the common parts will be omitted.

The second speed estimation unit 24 estimates the speed of the motor 5 based on Id2 and Iq2, outputs ωt, which is a speed estimated value, to the second torque current command generation unit 25, and outputs a phase θ2 of the motor 5 to the second voltage command generation unit 19 and the second three-phase/two-phase conversion unit 21. The second torque current command generation unit 25 generates the torque current command Iq2* based on the difference between the speed command ω* and the speed estimated value ω2 estimated by the speed estimation unit 24, and outputs the torque current command Iq2* to the torque current command distribution unit 23. The first torque current command generation unit 22 outputs a torque current command as in the exemplary configuration of FIG. 2. In the exemplary configuration illustrated in FIG. 5, this torque current command is shown as Iq1*.

In the exemplary configuration of FIG. 5, the speed estimation unit 17 estimates the speed estimated value ω and the phase estimated value θ as in the exemplary configuration of FIG. 2, but these are illustrated as the speed estimated value ω1 and the phase estimated value θ1. In the exemplary configuration of FIG. 5, the second voltage command generation unit 19 generates, based on Vd2, Vq2, and θ2, the output voltages Vu2, Vv2, and Vw2 of the second inverter 4 corresponding to the U phase, the V phase, and the W phase, respectively.

Assuming that the torque corresponding to Iq1* is represented by τ'1 and the torque corresponding to Iq2* is represented by τ'2, the torque current command distribution unit 23 distributes torques to the first inverter 3 and the second inverter 4 such that τ=τ'1+τ'2 is satisfied as in the exemplary configuration of FIG. 2 mentioned above. Then, torque current commands corresponding to the torques distributed to the first inverter 3 and the second inverter 4 are output to the first current control unit 13 and the second current control unit 18 as Iq1 and Iq2, respectively. Such control can make the accuracy of controlling the current of the first inverter 3 and the current of the second inverter 4 higher than that in the exemplary configuration illustrated in FIG. 2. Therefore, the motor 5 can be controlled with a higher degree of accuracy than in the exemplary configuration illustrated in FIG. 2 even when an imbalance occurs between the torque generated in the first inverter 3 and the torque generated in the second inverter 4.

Figure 6:
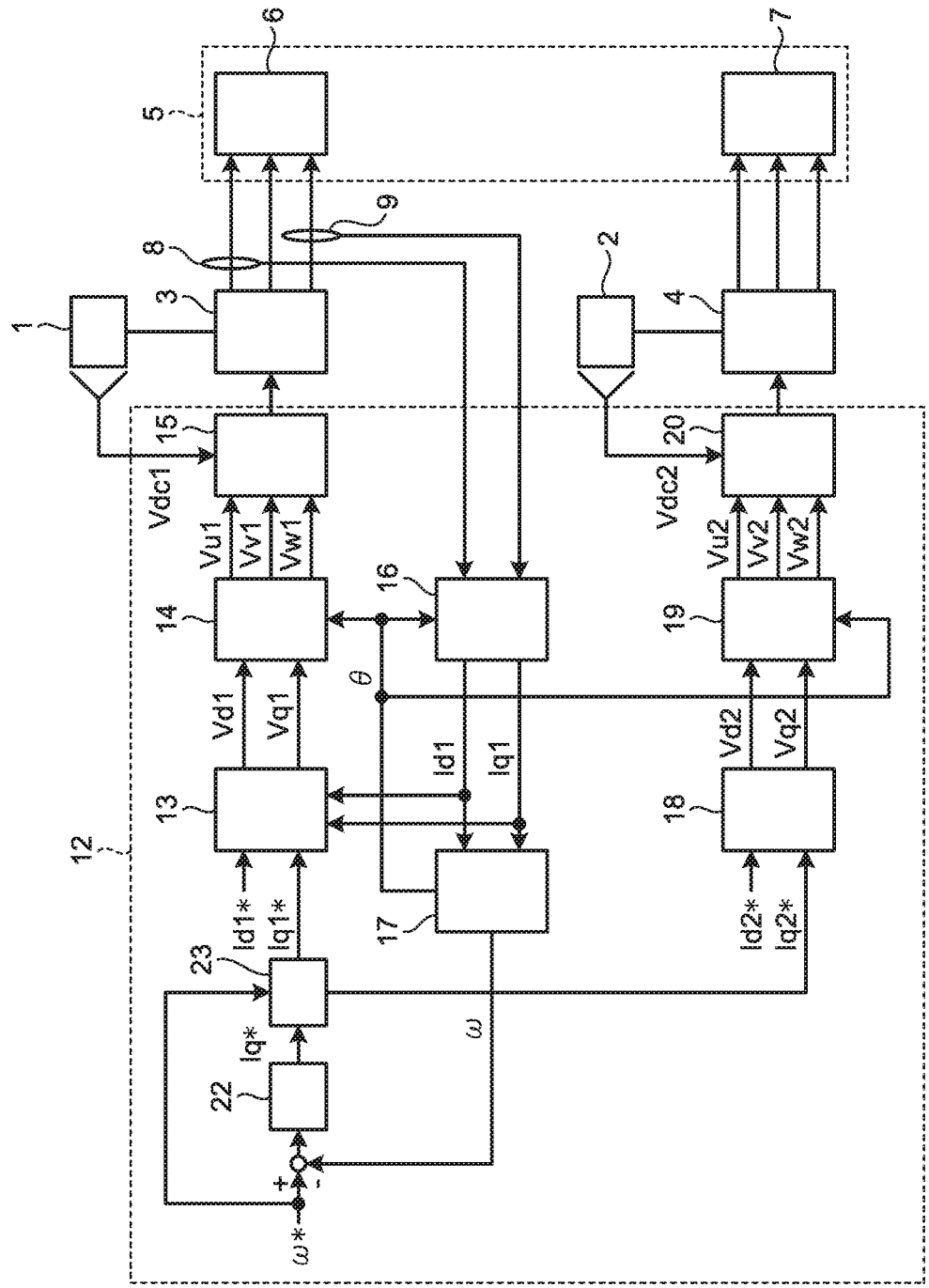
FIG. 6 is a diagram illustrating an exemplary configuration of the control unit according to the first embodiment in which current detection units that measure the motor current of the second winding portion and a second three-phase/two-phase conversion unit are deleted.

Further, the current detection unit 10 and the current detection unit 11 that measure the motor current of the second winding portion 7 and the second three-phase/two-phase conversion unit 21 may be deleted from the exemplary configuration illustrated in FIGS. 1 and 2. FIG. 6 is a diagram illustrating an exemplary configuration of the control unit 12 according to the first embodiment in which the current detection unit 10 and the current detection unit 11 that measure the motor current of the second winding portion 7 and the second three-phase/two-phase conversion unit 21 are deleted. In FIG. 6, components having the same functions as the functions of the exemplary configuration illustrated in FIG. 2 are denoted by the same reference signs as the reference signs in FIG. 2. Hereinafter, differences between the exemplary configuration of FIG. 6 and the exemplary configuration of FIG. 2 will be described, while explanations of the common parts will be omitted.

The second current control unit 18 generates and outputs the output voltages Vd2 and Vq2 corresponding to the d-axis and the q-axis of the second inverter 4 based on the torque current command Iq2* assigned by the torque current command distribution unit 23 and the d-axis torque current command Id2*. In the case of the exemplary configuration illustrated in FIG. 6, the cost can be reduced as compared with the exemplary configuration illustrated in FIG. 2 because the current detection unit 10 and the current detection unit 11 are not provided. In addition, in the exemplary configuration illustrated in FIG. 6, because the computation by the second current control unit 18 can be omitted, the computation load on the control unit 12 can be reduced as compared with the exemplary configuration illustrated in FIG. 2.

However, specific control blocks in the control unit 12 are not limited to the examples illustrated in FIGS. 2, 5, and 6 as long as the above-mentioned assignment of torques to the first inverter 3 and the second inverter 4 can be appropriately performed.

In FIGS. 1 and 2, motor current measurement is performed for the two phases of one winding portion, but motor current measurement may be performed for all the phases.

In the examples illustrated in FIGS. 1 and 2, the number of winding portions in the motor 5 is two, but the number of winding portions in the motor 5 may be three or more. In this case, each of three or more winding portions is either the first winding portion or the second winding portion. As described above, the number of turns of the second winding portion is larger than the number of turns of the first winding portion. Note that three or more winding portions include at least one first winding portion and at least one second winding portion. When there is a plurality of first winding portions, there is a plurality of first inverters, and the first inverters are each provided for each of the first winding portions. When there is a plurality of second winding portions, there is a plurality of second inverters, and the second inverters are each provided for each of the second winding portions.

Next, a hardware configuration of the control unit 12 according to the present embodiment will be described. The control unit 12 is realized by a processing circuit. This processing circuit may be a processing circuit which is dedicated hardware or a control circuit including a processor. In a case where the processing circuit is dedicated hardware, the processing circuit is, for example, a single circuit, a composite circuit, a programmed processor, a parallel programmed processor, an application specific integrated circuit (ASIC), a field programmable gate array (FPGA), or a combination thereof.

Figure 7:
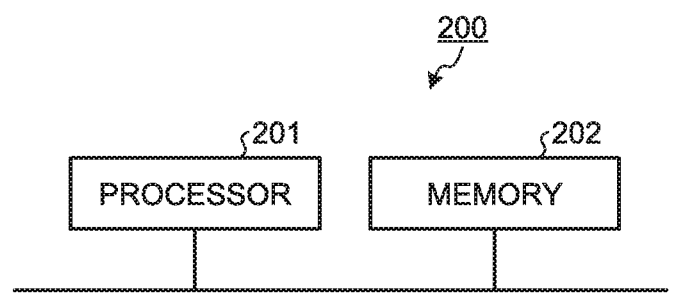
FIG. 7 is a diagram illustrating an exemplary configuration of a control circuit according to the first embodiment.

In a case where the processing circuit that realizes the control unit 12 is realized by a control circuit including a processor, this control circuit is, for example, a control circuit 200 configured as illustrated in FIG. 7. FIG. 7 is a diagram illustrating an exemplary configuration of the control circuit 200 according to the present embodiment. The control circuit 200 includes a processor 201 and a memory 202. The processor is a central processing unit (also referred to as a CPU, a central processing device, a processing device, a computation device, a microprocessor, a microcomputer, a processor, or a digital signal processor (DSP)) or the like. Examples of the memory include a non-volatile or volatile semiconductor memory, a magnetic disk, a flexible disk, an optical disc, a compact disc, a mini disc, a digital versatile disc (DVD), and the like. Examples of the non-volatile or volatile semiconductor memory include a random access memory (RAM), a read only memory (ROM), a flash memory, an erasable programmable read only memory (EPROM), an electrically erasable programmable read only memory (EEPROM), and the like.

When the processing circuit that realizes the control unit 12 is the control circuit 200 including the processor, the control unit 12 is realized by the processor 201 reading and executing a program describing the processing of the control unit 12 stored in the memory 202. The memory 202 is also used as a temporary memory for each process performed by the processor 201.

As described above, in the present embodiment, the number of turns of the second winding portion 7 is larger than the number of turns of the first winding portion 6. Therefore, it is possible to generate torque with a small current, which can lead to a reduction in loss. Thus, the motor loss of the second winding portion 7 and the inverter loss of the second inverter 4 can be reduced in the low rotation range.

Second Embodiment

In order to reduce the loss of the motor, it is possible to generate torque with a small current by increasing the number of turns of the second winding portion 7 of the motor 5 so as to achieve high winding. Therefore, the effect of reducing the loss of the inverter and the motor can be obtained when the rotational frequency of the motor 5 is small, that is, in the low rotation range. On the other hand, when the rotational frequency of the motor 5 is large, that is, in the high rotation range, the induced voltage of the motor 5 increases. Therefore, it is necessary to cause a current such as a field weakening current that does not contribute to torque to flow to the motor 5, causing an increase in the loss of the inverter and the motor. The second embodiment will describe a motor system capable of performing DC voltage control to enlarge the rotational frequency range in which a current such as a field weakening current that does not contribute to torque need not flow to the motor 5.

Figure 8:
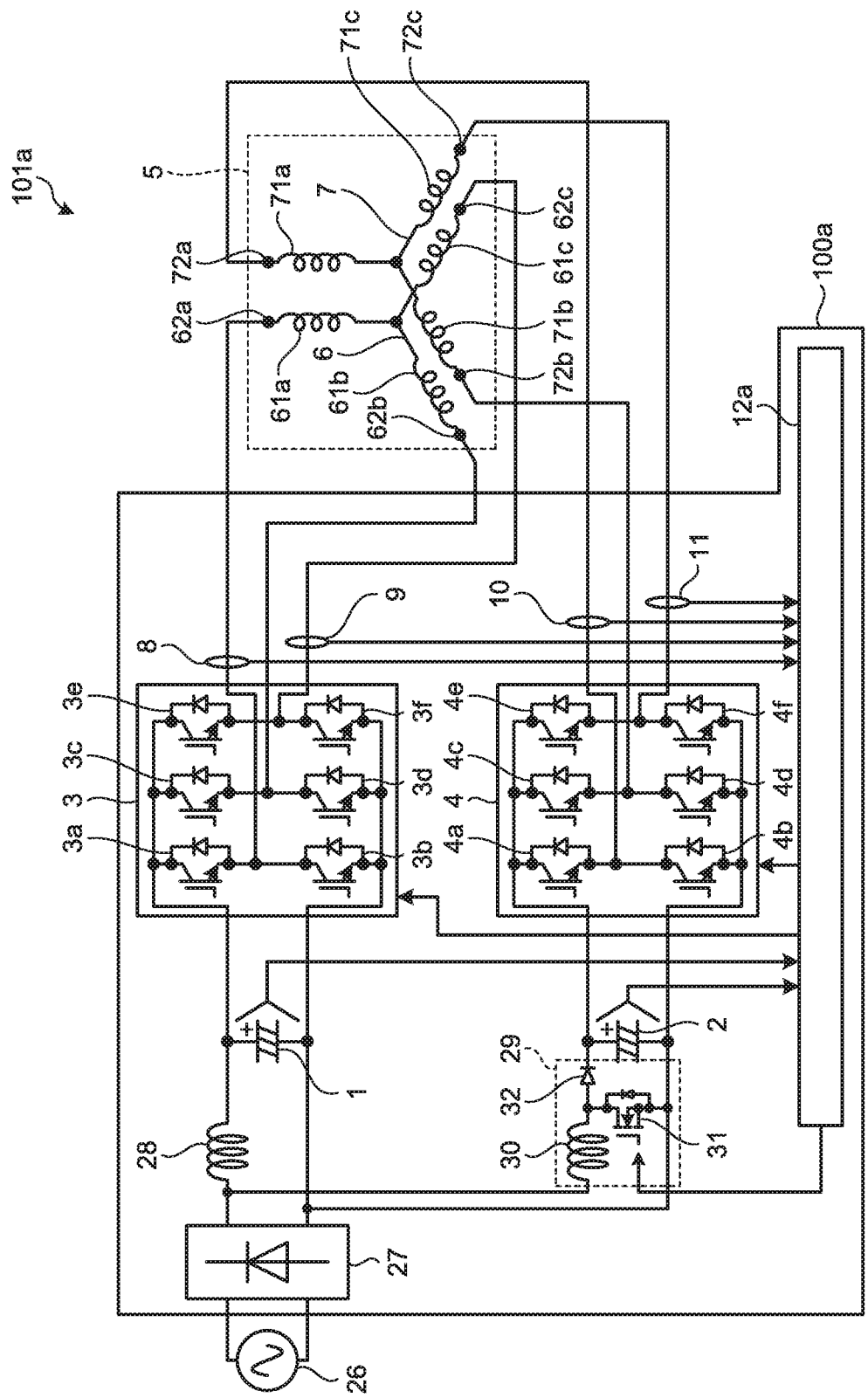
FIG. 8 is a diagram illustrating an exemplary configuration of a motor system according to a second embodiment.

FIG. 8 is a diagram illustrating an exemplary configuration of a motor system according to the second embodiment. The motor system 101a according to the second embodiment includes the motor 5 similar to that in the first embodiment and a motor drive device 100a that drives the motor 5. The motor drive device 100a includes a rectifier 27, a reactor 28, and a booster unit 29 in addition to the components of the motor drive device 100 according to the first embodiment, and includes a control unit 12a instead of the control unit 12.

The rectifier 27 converts AC power supplied from an AC power source 26 into DC power. The reactor 28 is connected between the rectifier 27 and the first smoothing unit 1. The booster unit 29 is connected between the rectifier 27 and the second smoothing unit 2. That is, the booster unit 29 is disposed between the rectifier 27 and the second inverter 4, and is connected to the second inverter 4 and the rectifier 27. The booster unit 29 includes a second reactor 30, a switch unit 31, and a reverse blocking diode 32. The second reactor and the reverse blocking diode 32 are connected in series. The switch unit 31 is disposed between the connection point between the second reactor 30 and the reverse blocking diode 32 and the connection point connected to the negative side, or the negative electrode, of the second smoothing unit 2. Components having the same functions as the functions in the first embodiment are denoted by the same reference signs as the reference signs in the first embodiment, and redundant explanations are omitted. Hereinafter, differences from the first embodiment will be described. In the example of FIG. 8, a single-phase AC power source is used as the AC power source 26, but the AC power source 26 may be a three-phase AC power source.

Figure 9:
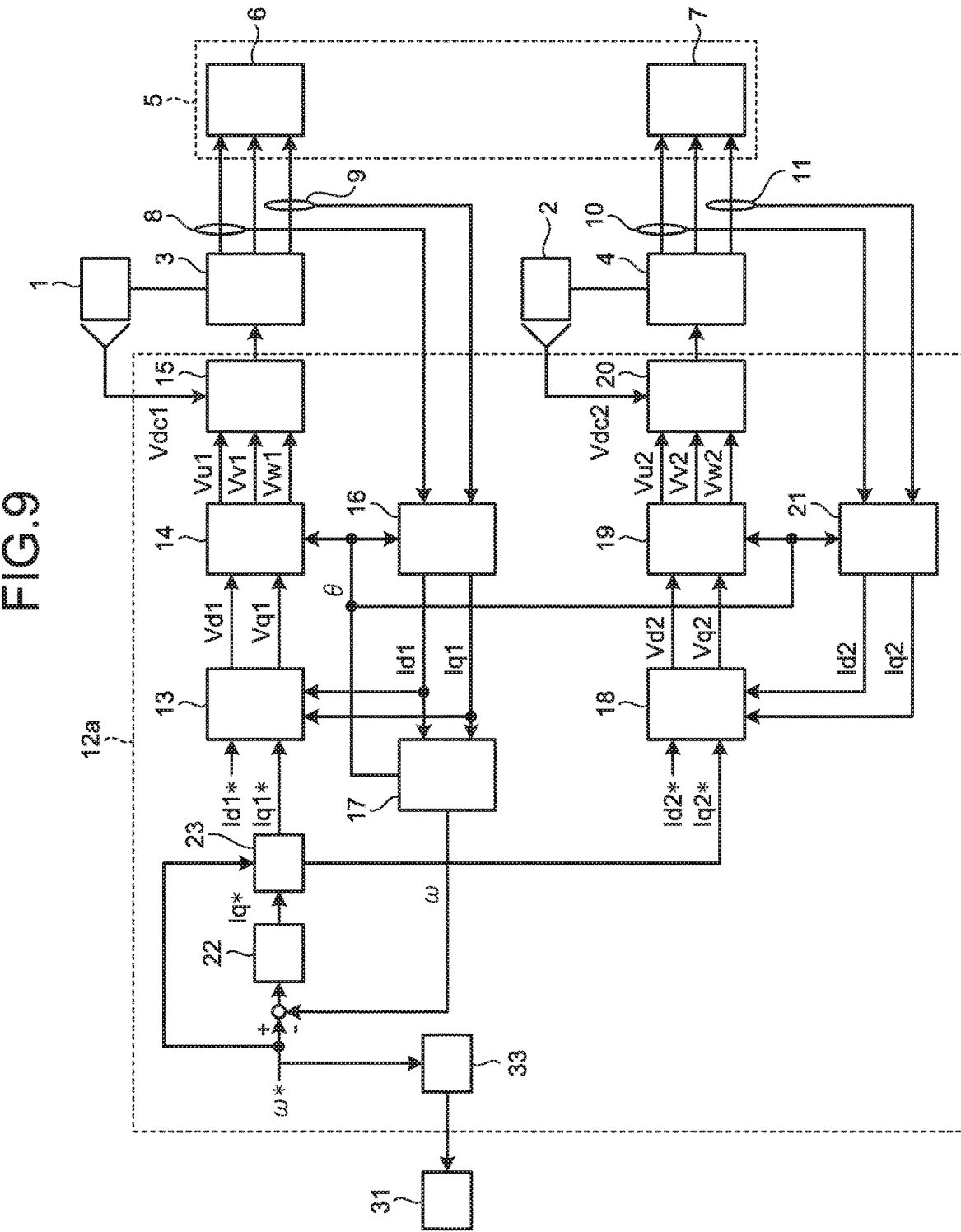
FIG. 9 is a diagram illustrating an exemplary configuration of a control unit according to the second embodiment.

FIG. 9 is a diagram illustrating an exemplary configuration of the control unit 12a according to the second embodiment. As illustrated in FIG. 9, the control unit 12a is the same as the control unit 12 of the first embodiment except that a boost control unit 33 is added to the control unit 12 of the first embodiment. Although FIG. 9 illustrates an example in which the boost control unit 33 is added to the control unit 12 illustrated in FIG. 1, the boost control unit 33 may be added to the control unit 12 of the exemplary configuration illustrated in FIG. 5 or 6.

Figure 10:
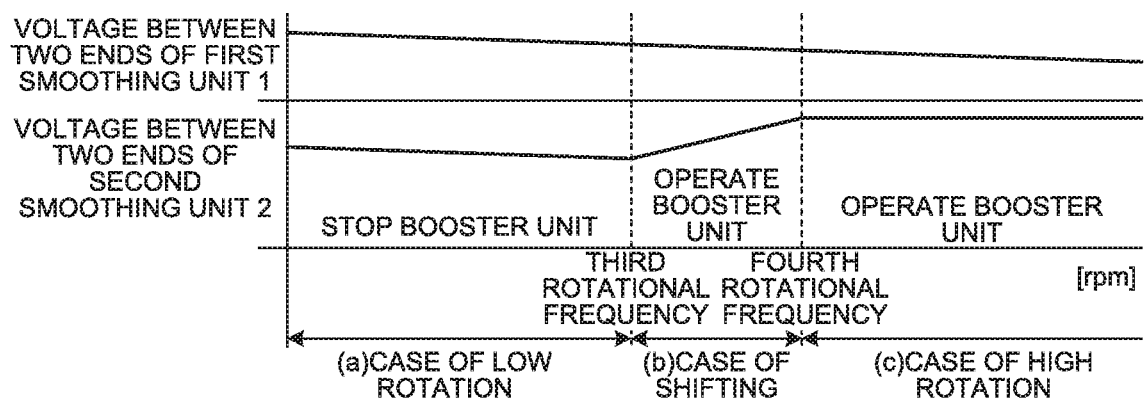
FIG. 10 is a diagram illustrating an example of the voltage between the two ends of each of first and second smoothing units with respect to rotational frequency according to the second embodiment.
Figure 11:
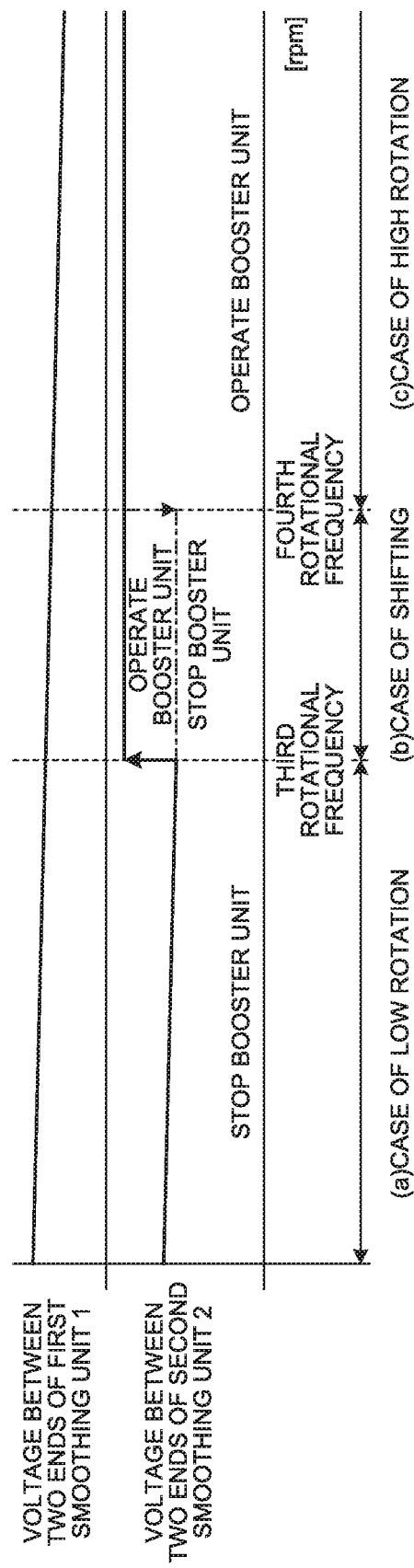
FIG. 11 is a diagram illustrating an example of the voltage between the two ends of each of the first and second smoothing units with respect to rotational frequency according to the second embodiment.

Next, operation of the present embodiment will be described. FIGS. 10 and 11 are diagrams illustrating examples of the voltage between the two ends of each of the first and second smoothing units with respect to rotational frequency according to the second embodiment. In FIGS. 10 and 11, the horizontal axis represents rotational frequency, that is, rotational speed, and the vertical axis represents the voltage between the two ends of each of the first and second smoothing units. In FIGS. 10 and 11, the voltage between the two ends of the first smoothing unit 1 is illustrated on the upper side, and the voltage between the two ends of the second smoothing unit 2 is illustrated on the lower side.

As illustrated in section (a) of FIG. 10, in a case where the rotational frequency corresponding to the speed command ω* is lower than a third rotational frequency determined in advance, that is, in the case of low rotation, the boost control unit 33 of the control unit 12a stops the booster unit 29, that is, turns off the switch unit 31.

As illustrated in section (c) of FIG. 10, in a case where the rotational frequency corresponding to the speed command ω* is equal to or higher than a fourth rotational frequency determined in advance, that is, in the case of high rotation, the boost control unit 33 of the control unit 12a operates the booster unit 29, that is, turns on or close the switch unit 31.

As illustrated in section (c) of FIG. 10, the control unit 12a operates the booster unit 29 in the case of high rotation, thereby performing control to cause the voltage between the two ends of the second smoothing unit 2 higher than the voltage between the two ends of the first smoothing unit 1. As described above, because the number of turns of the second winding portion 7 is larger than the number of turns of the first winding portion 6, in the high rotation range, the flow of a field weakening current or the like through the second winding portion 7 causes loss in the second inverter 4 and the second winding portion 7. However, by causing the voltage between the two ends of the second smoothing unit 2 higher than the voltage between the two ends of the first smoothing unit 1, the range of rotational frequencies in which the second inverter 4 can be controlled without a field weakening current is expanded, and thus the loss of the motor and the loss of the inverter can be reduced as compared with the first embodiment. Further, the second winding portion 7 can be controlled up to a higher rotational frequency than in the first embodiment, so that the output torque at the maximum rotational frequency of the motor 5 can be larger than that in the first embodiment.

As illustrated in section (b) of FIG. 10, in a case where the rotational frequency corresponding to the speed command ω* is equal to or higher than the third rotational frequency and lower than the fourth rotational frequency, the boost control unit 33 of the control unit 12a operates the booster unit 29 to gradually change the voltage between the two ends of the second smoothing unit 2 in particular by linearly complementing the voltage by a straight line.

Note that the method of changing the voltage between the two ends of the second smoothing unit 2 by the boost control unit 33 when the rotational frequency corresponding to the speed command ω* is equal to or higher than the third rotational frequency and lower than the fourth rotational frequency is not limited to the example illustrated in FIG. 10. For example, as illustrated in FIG. 11, hysteresis may be provided so that stepwise changes are performed between the third rotational frequency and the fourth rotational frequency set in advance. That is, in a case where the speed increases, the booster unit 29 is stopped in section (b) of FIG. 11, and in a case where the speed decreases, the booster unit 29 is operated in section (b) of FIG. 11.

As in the first embodiment, the control unit 12a may assign torques to the first inverter 3 and the second inverter 4 based on the rotational frequency corresponding to the speed command ω*, or may assign torques to the first inverter 3 and the second inverter 4 using other methods.

In a case where torques are assigned to the first inverter 3 and the second inverter 4 based on the rotational frequency corresponding to the speed command ω* as in the first embodiment, assuming that $n_{min}$ represents the minimum rotational frequency that requires the flow of a field weakening current or the like when there is no difference between the voltage between the two ends of the first smoothing unit 1 and the voltage between the two ends of the second smoothing unit 2, for example, the first rotational frequency and the second rotational frequency are determined based on $n_{min}$ in the first embodiment. In the present embodiment, by setting the fourth rotational speed to $n_{min}$ or less, it is unnecessary to cause a field weakening current or the like to flow at $n_{min}$, and to determine the first rotational frequency and the second rotational frequency based on $n_{min}$. Therefore, the first rotational frequency and the second rotational frequency can be set to higher rotational frequencies than in the first embodiment.

In order to stop the operation of the first inverter 3 and the second inverter 4, first, the rotational frequency of the second inverter 4 is lowered, the booster unit 29 is stopped, the second inverter 4 is stopped before the first inverter 3, and the first inverter 3 is stopped. This is for preventing a regenerative voltage from being generated at the time of stopping the second inverter 4 due to a large number of turns of the second winding portion 7.

As described above, in the second embodiment, as in the first embodiment, the number of turns of the second winding portion 7 is larger than the number of turns of the first winding portion 6, and the voltage between the two ends of the second smoothing unit 2 is controlled to a voltage higher than the voltage between the two ends of the first smoothing unit 1 in the case of high rotation. Therefore, effects similar to the effects in the first embodiment can be obtained, and the loss of the motor and the inverter can be reduced as compared with the first embodiment.

Third Embodiment

Figure 12:
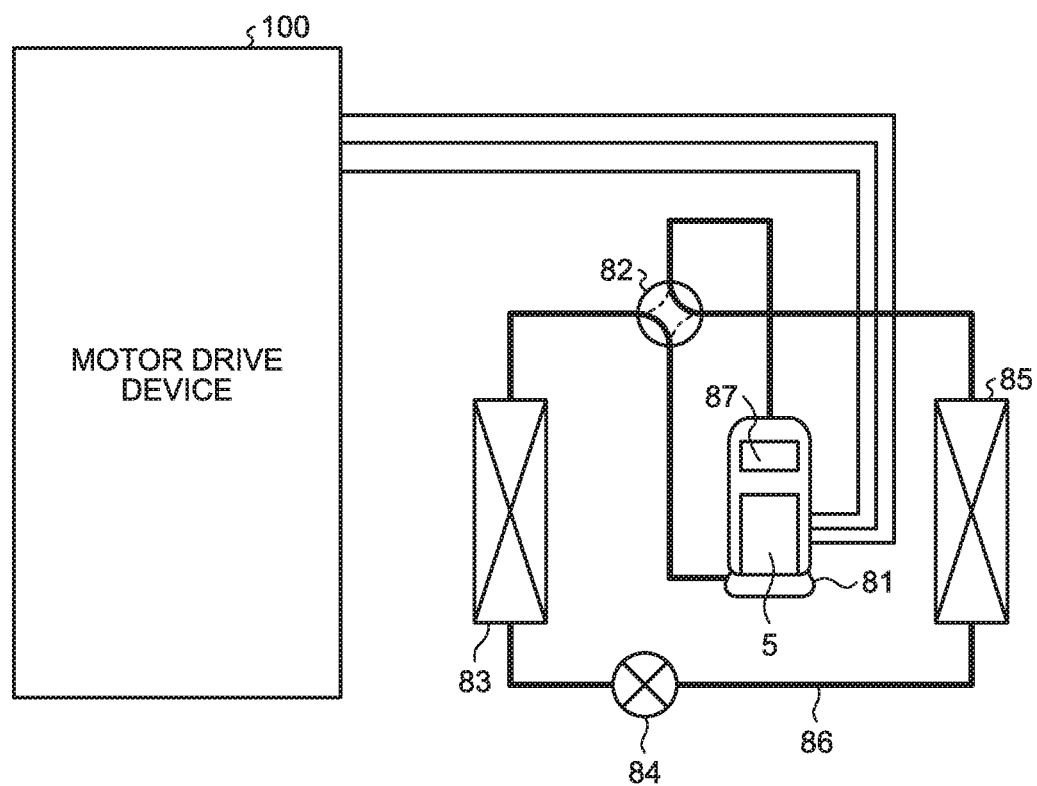
FIG. 12 is a diagram illustrating an exemplary configuration of an air conditioner according to a third embodiment.

FIG. 12 is a diagram illustrating an exemplary configuration of an air conditioner according to the third embodiment. The air conditioner according to the present embodiment includes the motor system 101 described in the first embodiment or the motor system 101a described in the second embodiment. Although FIG. 12 illustrates an example that includes the motor system 101 of the first embodiment, the motor system 101a may be provided instead of the motor system 101 of the first embodiment. The air conditioner of the present embodiment includes a refrigeration cycle i.e. a refrigeration cycle device, in which a compressor 81, a four-way valve 82, an outdoor heat exchanger 83, an expansion valve 84, and an indoor heat exchanger 85 are attached via a refrigerant pipe 86, and constitutes a separate type air conditioner. The motor 5 of the first embodiment, that is, the motor 5 of the motor system 101, is included in the compressor 81. The motor 5 is controlled by the motor drive device 100.

A compression mechanism 87 that compresses a refrigerant and the motor 5 that drives the compression mechanism 87 are provided inside the compressor 81. The refrigerant circulates between the outdoor heat exchanger 83 and the indoor heat exchanger 85 from the compressor 81, whereby the refrigeration cycle for cooling and heating or the like is configured. The configuration illustrated in FIG. 12 can be applied to not only the air conditioner but also an instrument including the refrigeration cycle such as a refrigerator and a freezer.

The configuration described in the above-mentioned embodiments indicates an example of the contents of the present invention. The configuration can be combined with another well-known technique, and a part of the configuration can be omitted or changed in a range not departing from the gist of the present invention.

The invention claimed is:

1. A motor system comprising:
a first inverter;
a second inverter;
a motor comprising a first winding portion connected to the first inverter and a second winding portion connected to the second inverter;
a rectifier to convert AC power into DC power; and
a booster unit disposed between the rectifier and the second inverter and connected to the second inverter and the rectifier, wherein
the first winding portion has a first number of turns,
the second winding portion has a second number of turns, and
the second number is larger than the first number.

2. The motor system according to claim 1, wherein a withstanding voltage of the second inverter is higher than a withstanding voltage of the first inverter.

3. The motor system according to claim 1, wherein a current capacity of the second inverter is smaller than a current capacity of the first inverter.

4. The motor system according to claim 1, comprising:
a first smoothing unit connected to the first inverter to supply DC power to the first inverter; and
a second smoothing unit connected to the second inverter to supply DC power to the second inverter, wherein
a withstanding voltage of the second smoothing unit is higher than a withstanding voltage of the first smoothing unit.

5. The motor system according to claim 1, wherein a withstanding voltage of the second winding portion is higher than a withstanding voltage of the first winding portion.

6. The motor system according to claim 1, wherein an insulation classification of the second winding portion is higher than an insulation classification of the first winding portion.

7. The motor system according to claim 1, wherein the booster unit does not operate when a rotational frequency of the motor is lower than a rotational frequency determined in advance, and operates when the rotational frequency of the motor is equal to or higher than the rotational frequency determined in advance.

8. The motor system according to claim 1, comprising
a processor to execute a program; and
a memory to store the program which, when executed by the processor, performs processes of,
generating torque current commands corresponding to the first inverter and the second inverter such that a torque corresponding to the second inverter is larger than a torque corresponding to the first inverter when the rotational frequency of the motor is lower than a first rotational frequency determined in advance.

9. The motor system according to claim 8, wherein
when the rotational frequency of the motor is equal to or higher than a second rotational frequency that is equal to or higher than the first rotational frequency, the processor generates torque current commands corresponding to the first inverter and the second inverter such that a torque corresponding to the first inverter is larger than a torque corresponding to the second inverter.

10. The motor system according to claim 1, wherein
a carrier used for generating a signal for driving the first inverter and a carrier used for generating a signal for driving the second inverter are shifted by half a carrier period.

11. The motor system according to claim 1, wherein
a switching element constituting the first inverter is made of a silicon semiconductor, and a switching element constituting the second inverter is made of a wide bandgap semiconductor.

12. The motor system according to claim 1, wherein
a switching frequency of the second inverter is higher than a switching frequency of the first inverter.

13. A refrigeration cycle device comprising
the motor system according to claim 1, wherein
the refrigeration cycle device includes a compressor in which the motor of the motor system is included.

14. An air conditioner comprising the refrigeration cycle device according to claim 13.

* * * * *